2,907,749

POLYURETHANE OF A POLYISOCYANATE AND A SELF-ESTER OF A HYDROXYARYL-ALIPHATIC ACID OR AN ACYL DERIVATIVE THEREOF

Sylvan O. Greenlee, Racine, Wis.

No Drawing. Application July 17, 1957
Serial No. 672,376

14 Claims. (Cl. 260—47)

This invention relates to novel resinous compositions of matter of the polyurethane type and is directed more particularly to synthetic resinous compositions derived from the reaction of polyisocyanates with an autoester of a hydroxyaryl-aliphatic acid or an acyl derivative thereof. For the purpose of this specification and the claims "autoester" and "self-ester" are used interchangeably.

The principal object of the invention is the synthesis along the general lines of known reactions of a film-forming product characterized, by virtue of the novel reactants from which it is derived, with improved properties especially as regards resistance to attack by chemicals, resistance to wear or damage, and resistance to penetration and solvent action by water.

By suitable adjustment of the conditions of the reaction and the ingredients, the product of the invention may be caused to assume a cellular or foam state, and, accordingly, an additional aim of the invention is the provision of light-weight three-dimensional solids possessing good structural strength and, therefore, useful in load-bearing applications.

The invention also embraces a new class of synthetic resinous compositions which are capable of further reaction to give infusible, insoluble materials suitable for use as protective coatings, adhesives, and molding resins.

These and other objects are accomplished by the improvement set forth herein, which contemplates the reaction of a substantial amount of an isocyanate or isothiocyanate, at least half of which must contain two or more isocyanate or isothiocyanate groups per molecule, and the autoester of an aliphatic acid, having a total of at least five carbon atoms, one of which is substituted with two hydroxyaryl groups; or a long-chain saturated or unsaturated acyl derivative of such autoester.

Hydroxy-acids, having both carboxyl and hydroxyl radicals are capable of undergoing self-esterification, the hydroxyl radical of one molecule condensing with the carboxyl radical of another molecule. The term "autoester" is employed as denoting the products of this reaction.

It has been found that the reaction of hydroxyaryl aliphatic acid autoesters with polyisocyanates is an advantageous mechanism for obtaining polymeric resinous compositions characterized by excellent protective coating and adhesive properties when used as a film, and relatively high structural strength when cast into foam resin bodies. The autoesters are well adapted for the reaction by virtue of the presence in each molecule thereof of hydroxyl radicals as well as terminal carboxyl radicals. As will be explained more fully, both hydroxyl and carboxyl radicals condense with isocyanate groups and, thus, may serve as reactive foci leading to the formation of a resinous product; in addition, the carboxyl radical in the condensation liberates carbon dioxide which is of assistance in producing foam resin structures. Hydroxyaryl and acyloxyaryl aliphatic acid autoesters useful herein are solid glassy resinous compositions which contain a plurality of unique symmetrical residues and tend to contribute to an ultimate reaction product derived therefrom such properties as outstanding chemical resistance, especially to alkalis, and, in some instances, a desirable degree of hardness and toughness. Chemical resistance is, for example, of great value in the formulation of protective coatings which are likely to be subjected in the course of ordinary usage to contact with various chemicals. The presence in the resin of aromatic residues having a symmetrical structure tends to result in a more rigid product, a feature of much advantage in polyurethane foams.

The hydroxyaryl-aliphatic acids used for autoesterification may be, and preferably are, prepared by condensing a phenolic compound with a keto-acid under such conditions that two hydroxyaryl radicals are attached to the same carbon atom of the acid. In order for the yields of this reaction to achieve useful levels, it is necessary, first, that the keto-carbon atom occur at the position adjacent to a terminal methyl group, and second, that the keto-acid have at least five carbons in the aliphatic chain. The keto-acid of this type which has only four carbon atoms, aceto-acetic acid, is highly unstable under the conditions necessary for the reaction and does not produce the desired product.

The five-carbon acid, levulinic acid, gives excellent yields. Higher acids are apparently useful, but these exist principally as laboratory curiosities and are not available in commercial quantities. There is disclosed in prior co-pending applications, Serial Nos. 464,607 and 489,300, filed October 25, 1954, and February 18, 1955, respectively, a number of illustrative acids that have been found to be particularly suitable for use, as well as methods of preparing the same. These acids consist of the condensation products of levulinic acid and phenol, substituted phenols, or mixtures of phenol and substituted phenols and shall, for the sake of brevity, be referred to herein as "the Diphenolic Acid."

The term "substituted phenols" is used herein to embrace phenols and phenolic compounds wherein one or more hydrogen atoms of the phenyl nucleus is replaced by an atom or group that does not enter into, or otherwise interfere with, the condensation of the compound with the keto-acid. Thus, for example, the nucleus may be alkylated with a methyl or other alkyl group, preferably having not more than five carbon atoms, as disclosed in the aforementioned application, Serial No. 489,300, or halogenated with bromine, fluorine, chlorine, or combinations thereof, provided that the total number of substituents, including hydroxyl groups, in each phenyl nucleus does not exceed three. The Diphenolic Acid derived from substituted phenols, such as the alkylated phenols, is sometimes more desirable than the products obtained from unsubstituted phenols since the alkyl groups tend to provide better organic solvent solubility, flexibility, and water-resistance, as well as influencing the nature and extent of subsequent reactions for which the acids are adapted. However, the unsubstituted product is usually more readily purified.

The autoesters of the Diphenolic Acid may be prepared in several ways. One of the most convenient involves heating the particular acid to a temperature of about 190° to 250° C. in the presence of acetic anhydride, the amounts of the latter being selected in accordance with the extent of esterification desired. This reaction proceeds in accordance with the following formula, using 4,4-bis(4-hydroxyphenyl)pentanoic acid as the Diphenolic Acid:

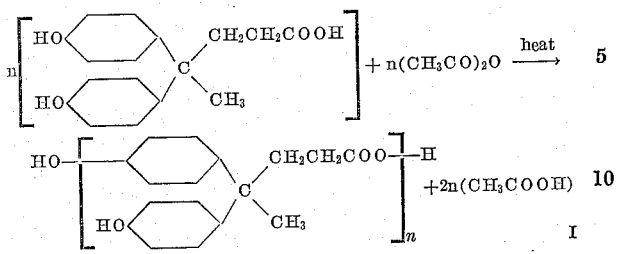

As can be seen from this formula, the number of molecules of acetic anhydride present determines the number of molecules of the acid that will autoesterify and, thus, the ratio of molecules of acetic anhydride to carboxyl groups gives an indication of the average number of molecules of acid that will condense to form the autoester. For example, if one-half mole of acetic anhydride is used for each mol of acid, giving a ratio of two carboxyl groups to one acetic anhydride molecule, two molecules of the acid, on the average, would be expected to condense and the predominate product of the above reaction would have a value of two for $n$. Such a product would be a triphenolic monocarboxylic acid, having the following formula:

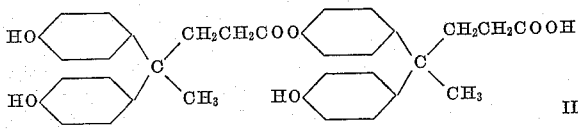

Where less than one-half mol of anhydride per mol of acid is present, some of the acid will be unreacted. Where one mol of anhydride per mol of acid is present, a highly polymeric product can be obtained, which is to say, that the value of $n$ in Formula I will be on the average more than two. Accordingly, by careful adjustment of the ratio of reactants, the average number of monomeric units in the reaction product can be more or less predetermined as well as the ratio of available hydroxyl radicals to carboxyl radicals in the reaction product. Consequently, the reaction permits a product to be "tailored" to provide certain characteristics, such as acid number, saponification number, etc.

As a practical matter, the number of monomeric units in the product depends on the reaction conditions as well as on the available acetic anhydride. In the reaction, as is demonstrated by the examples, acetic acid is removed by distillation during the auto-esterification. If only a part of the potentially recoverable acetic acid is distilled off, the autoester will contain relatively fewer monomeric units, the remaining acetic acid being retained as the acetate of the hydroxyaryl acid. As more acetic acid is removed, more molecules of the acid are caused to couple and a higher polymer will result.

It will be understood, of course, that the reaction product will be in actuality, a mixture of materials of varying degree of condensation and only the average degree can be predicted. Also, in some cases, both hydroxyl radicals of one or more molecules of the acid may be esterified, so that the reaction product may include branched or even cross-linked structures, all of which are embraced by the invention. Bearing in mind that Formula I represents the theoretical results of the reaction, the invention may be considered as including any product thereof where $n$ is an integer greater than 1. In reactions, where $n$ is greater than about 15, there are practical difficulties in obtaining the autoester in usable form, since the reaction mass ordinarily becomes solid, insoluble, and infusible, thus difficult to handle.

There being two aryl hydroxyl radicals to one carboxyl radical in each molecule of the Diphenolic Acid, only up to about one-half of the aryl hydroxyl radicals can take part in the auto-esterification, the remaining hydroxyl radicals being free to undergo further reaction, as will be described. Should the amount of acetic anhydride used in the reaction of Formula I exceed one mol for each mol of acid, an equivalent amount of the acetylated phenolic hydroxyl groups will remain in the autoester. As will appear later, this is not necessarily disadvantageous, but may, in fact, be helpful.

Another method of forming the autoesters involves heating the Diphenolic Acid in the presence of a chlorinating agent, such as thionyl chloride or phosphorus pentachloride. In these reactions, the carboxyl radicals of the acid first react with the chlorinating agent to form the acid chloride. The latter then reacts with a phenolic hydroxyl group of another molecule of the acid or acid chloride producing the autoester accompanied by the liberation of HCl. The two steps of the overall reaction occur very quickly in succession, so much so that they appear to be taking place almost simultaneously. Just as in the case of the acetylation mechanism, the extent of auto-esterification is controlled largely by the amount of the chlorinating agent present. As a general rule, the acetylation reaction is the more facile, requiring less extreme conditions of temperature, for example, to achieve a given degree of auto-esterification, especially where the number of monomeric units is large, and is therefore preferred.

Finally, low polymer products having a relatively low ratio of hydroxyl radicals to carboxyl radicals, such as that represented by Formula II, for instance, can be obtained by the use of heat alone at temperatures within the approximate range of 190°–275° C., under conditions such that the water produced as a by-product of the esterification is continuously removed. Any of the known methods for removing water from a reaction mass can be utilized, including bubbling a gas inert to the reactants through the reaction mixture to convey the water away in the form of a vapor or azeotropic distillation with a hydrocarbon solvent so that water vapor is evolved.

The autoesters contemplated for use in the present invention may have a portion of their unreacted phenolic hydroxyl groups esterified with a long-chain, saturated or unsaturated, mono-carboxylic acid. Virtually all saturated and unsaturated mono-carboxylic acids having at least about 10 carbon atoms can be employed as well as mixtures of such acids. A variety of acids of both types are available to the art. For instance with respect to unsaturated acids, mention may be made of the drying oil fatty acids normally containing about 16 to 22 carbon atoms, which are obtained by the saponification of naturally-occurring unsaturated vegetable oils, such as China-wood oil, oiticica oil, linseed oil, soyabean oil, corn oil, and cottonseed oil. The fish oils, extracted principally from the menhaden and the sardine, contain the glycerides of highly unsaturated acids, having an iodine number of about 130–190, and free acids derived from this source by saponification are also suitable. As is well known, most of the unsaturated acids in natural oils are in the form of glycerides. By reacting the glyceride with an alkaline compound, such as caustic, the alkaline salt of the acid is formed which can be converted to the free acid by treatment with a mineral acid, such as sulfuric acid. In addition to the natural unsaturated acids, those produced synthetically are equally operable. For example, mixed acids of the linoleic acid series are prepared by saponifying dehydrated castor oil, or linoleic acid can be produced by hydroxylating oleic acid to yield dihydroxystearic acid, which is then dehydrated. Acids having a relatively high molecular weight are preferred; lower acids can be employed, however, if air-drying characteristics are the principal desiderata. Acids containing less than about ten carbon atoms contribute little in the way of plasticization, a major reason for acylating the autoester. An example of one of the lower acids that can be employed is undecylenic acid, containing eleven carbon atoms, which is prepared commercially by the decomposition of castor oil acids.

With respect to saturated acids, the only important criterion is, again, a chain length of at least about 10 carbon atoms. Examples of suitable acids are lauric, palmitic, stearic, and carnaubic acids, to indicate just a few. Such acids contribute a plasticizing effect to the polymer molecule similar to the unsaturated acids; on the other hand, lacking unsaturation, they do not undergo polymerization.

The sequence in which the esterification steps are carried is not important to the results of the invention, and where the language, "autoester of an acyloxyaryl aliphatic acid," or its equivalent, appears hereinafter in the specification and claims, it is not to be limited to the autoester of a previously prepared saturated or unsaturated acid ester of a hydroxyaryl aliphatic acid. At least several methods are available for introducing the acyl radical into the autoester, either before or after formation of the autoester itself or simultaneously therewith. One of the most convenient of these involves reacting the product obtained by Equation I, or either of the alternative procedures, with the saturated or unsaturated acid in the presence of acetic anhydride. This may be represented as follows, using linoleic acid as an example:

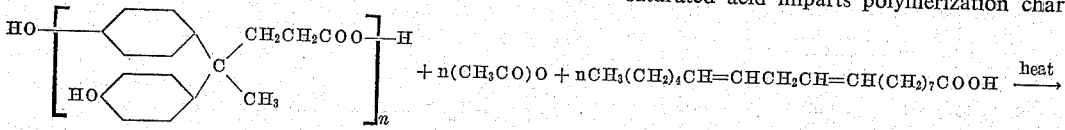

The amount of acetic anhydride controls the degree of esterification along with the reaction conditions and should ordinarily be at least equivalent to the amount of saturated or unsaturated long-chain acid to be reacted to avoid an excess of the acid. During the course of this reaction, the phenyl acetates of the simple autoester of Equation I are formed. By raising the temperature above the boiling point of acetic acid, the long-chain acid replaces the acetate radical on the phenyl nucleus and the acetic acid and unreacted anhydride are removed by distillation. In some instances, it may be desirable to acetylate the autoester before the addition of the long-chain acid to effect acid displacement. Where an excess of acetic anhydride is employed in the reaction of Equation I, the phenyl acetate of the autoester is the natural result and further acetylation is unnecessary.

As an alternative procedure, the esterified autoester can be prepared directly by the co-esterification of mixtures of the Diphenolic Acid and the desired long-chain acid in the presence of acetic anhydride, using the latter in amounts equivalent to the combined carboxyl radical content of both acids. Such a one-step reaction may be illustrated as follows, using 4,4 bis(4-hydroxyphenyl) pentanoic acid and linoleic acid as reactants:

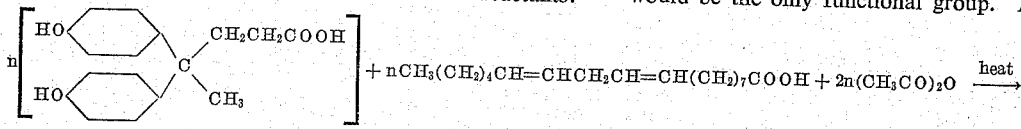

In the last Reaction IV, it is thought that, to a large extent, the simple long-chain acid ester is formed initially and that this ester then undergoes auto-esterification, although all possible sequences of steps undoubtedly occur to some degree. It is to be understood that both Reactions III and IV represent the theoretical probability and are quite likely oversimplified; all of the molecules of the Diphenolic Acid will not necessarily have both hydroxyl groups esterified as shown. Similar to Equation I, while $n$ in Equations III and IV may be virtually any number, it preferably ranges from 2 to 15; above the latter, the product is characterized by insolubility and infusibility and can usually be purified only with great difficulty, if at all.

A further possible method for effecting esterification includes the steps of converting the long-chain acid to the acid chloride along the same lines as referred to in the discussion relating to the simple autoester and reacting the acid chloride directly with the aromatic hydroxyl groups of the Diphenolic Acid to form the ester accompanied by the liberation of HCl.

As has already been alluded to, the chief purpose in employing the autoester of the acylated acid rather than the simple autoester is to build into the product certain plasticizing characteristics which can be reasonably well controlled by selection of the length of the long-chain acid and the amounts of acid employed. Moreover, an unsaturated acid imparts polymerization characteristics so that conversion can be facilitated by exposure to air or the application of heat. The degree of such characteristics, of course, depends upon the extent of unsaturation of the long-chain acid. The acyloxy autoester can ordinarily be expected to have a lower softening point than the same autoester free of further esterification.

From the preceding discussion, it can be seen that autoesters suitable for use in preparing the ultimate compositions of the present invention can be represented by the following generic formula:

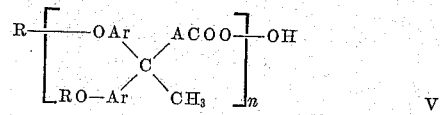

where Ar is an aryl radical, A is a bivalent alkylene radical having at least two carbon atoms, $n$ is a number greater than 1, and R is hydrogen or an acyl radical, saturated or unsaturated, having at least about 10 carbon atoms. For a compound having this formula to react with a polyisocyanate or polyisothiocyanate to form a resinous composition, every R in every molecule thereof cannot be an acyl radical; otherwise, the carboxyl group would be the only functional group. Accordingly, Formula V is subject to the further restriction that there is an average total of functional carboxyl and hydroxyl radicals which is greater than 1 and preferably greater than about 1.5.

The other component of the reaction of the present invention is an isocyanate or isothiocyanate compound. In order that a resinous product be obtained, the isocyanate or isothiocyanate compound must contain two or more isocyanate or isothiocyanate groups, a plurality of reactive foci being essential if a chain or cross-linked structure is to be developed by condensation with the functional groups of the simple or acylated autoester. Accordingly, the principal reaction contemplated herein may be described as between the autoester and a polyisocyanate having the general formula $R(NCX)_z$, where X is a chalcogen having an atomic weight less than 33, i.e., oxygen or sulfur; z is an integer of more than one; and R is a polyvalent organic radical with the number of valences being equal to z. There are numerous compounds coming within this general formula that are suitable for the reaction and no attempt will be made to give an exhaustive list. The following are considered illustrative and will suggest to the expert a variety of others: alkylene diisocyanates; such as ethylene diisocyanate, trimethylene diisocyanate, tetramethylene diisocyanate, hexamethylene diisocyanate, decamethylene diisocyanate, and their corresponding sulfur analogues; cyclo-alkylene diisocyanate, such as cyclopentylene diisocyanate, cyclohexylene diisocyanate, and their corresponding sulfur analogues; aromatic diisocyanates, such as m-phenylene diisocyanate, naphthalene diisocyanate, diphenyl-4,4'-diisocyanate, and their corresponding sulfur analogues; aliphatic-aromatic diisocyanates, such as xylene-1,4-diisocyanate, diphenylene methane diisocyanate and their corresponding sulfur analogues; hetero-, diiso- and diisothiocyanates, such as $SCNCH_2OCH_2NCS$ and $SCNCH_2SCH_2NCS$: and isocyanates and isothiocyanates having more than two isocyanate or isothiocyanate groups, such as benzene 1,2,4-triisocyanate, 1,2,2-triisocyanatobutane, and toluene triisocyanate. From among these and other polyisocyanates and polyisothiocyanates, the following are preferred largely by reason of their ready commercial availability: toluene 2,4 diisocyanate, toluene 2,6 diisocyanate, methylene bis (4-phenyl isocyanate), 3,3' bitolyene 4,4' diisocyanate, and hexamethylene diisocyanate. In order to simplify the remainder of the discussion, the repetitious recital of both the oxygen and sulfur forms will be dispensed with; only the oxygen compound will be given but will be understood as embracing the corresponding sulfur analogue.

While, as has already been mentioned, the principal reaction requires a polyisocyanate compound, it may be desirable for certain applications to modify the product by using, in addition, a minor portion of a monoisocyanate. Many of the reaction products of the autoesters with polyisocyanates alone tend to be brittle, infusible products. However, flexibility can frequently be obtained by the addition to the reaction mixture of a proper amount and type of monoisocyanate. Examples of suitable monoisocyanates are octadecylisocyanate, hexyl isocyanate, phenyl isocyanate and naphthalene isocyanate, to mention just a few of the simpler compounds. Flexibility is particularly likely to appear where long-chain compounds, i.e., having more than 11 carbons, are employed, as these compounds have a plasticizing influence similar to the long-chain acyl radicals in the autoester. Unsaturated monoisocyanates are also suitable and provide an additional aid to conversion or curing. The amount of the mono-compound that is added to the acid and polyisocyanate as a modifier will vary depending upon the characteristics desired in the product. As a general rule, there should be present a greater amount of the poly-compound than the mono-compound, which is to say, that the monoisocyanate should be less than 50% of the total of all isocyanates in the reaction mixture. If a more rigid, material is sought, the quantity of the mono-form should be decreased, while if more flexibility is the desideratum, it should be increased toward the upper limit just mentioned. The functional group of the mono-form may react with the carboxyl or hydroxyl groups of the autoester to reduce cross-linking between adjacent molecules of the polymer and thereby influence the product in the direction of softness and pliability in proportion to the amount present, or preclude further growth of the chain.

The general chemistry of the present reaction appears to be basically simple. It is well known that isocyanates react with both hydroxyl groups and carboxylic acid groups. The reaction of a diisocyanate, having the general formula $R'(NCO)_2$, with an aromatic or aliphatic hydroxyl compound ROH, proceeds in the following manner:

$$R'(NCO)_2 + 2ROH \rightarrow R'(NHCOOR)_2$$

In similar fashion, the reaction between a diisocyanate and an carboxylic acid, RCOOH, is as follows:

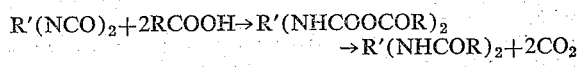

$$R'(NCO)_2 + 2RCOOH \rightarrow R'(NHCOOCOR)_2$$
$$\rightarrow R'(NHCOR)_2 + 2CO_2$$

It will be seen that, if the phenolic compound contains at least two hydroxyl groups or if the carboxylic acid contains at least two acid groups, the resulting product in either case would be polymeric. Likewise, it will be observed that if a compound is used containing both carboxyl and hydroxyl groups, there is the possibility of simultaneous reaction of both with the isocyanate to give polymeric compounds. It will likewise be noted that the reaction with a carboxyl-containing compound gives, as a by-product of the reaction, carbon dioxide which may be used to form cellular structures in those reaction products which are itended to be three-dimensional structures.

Applying these general considerations to the reactants proposed herein, the autoester of a hydroxyaryl or acyloxyaryl-aliphatic acid and a polyisocyanate $R(NCO)_z$, it will be appreciated that there are several directions in which the reaction might go. An isocyanate residue may bridge phenolic hydroxyl groups of two molecules of the autoester, carboxyl groups of two molecules, or a hydroxyl group of one and a carboxyl group of another. The nature and extent of the reactions which actually occur are dependent upon the number and type of functional groups present in the autoester, the amount of isocyanate available for reaction and the distribution of the isocyanate molecules among the autoester molecules. The choice of relative proportions of autoester and polyisocyanate is dictated principally by the nature of the ultimate product to be obtained. Experience has indicated that a product having useful characteristics attributable to both reactants is obtained generally at a ratio of equivalent weights of autoester to polyisocyanate within the range of 1:5 to 5:1. From a consideration of the reaction, it will be understood that the optimum situation usually prevails where essentially all of the functional groups of the autoester are reacted with the functional groups of the polyisocyanate. For this reason, a preferred range is 2:1 to 1:2 of autoester to isocyanate on equivalent basis with a 1:1 ratio being most desired. It is difficult to make any broad all-inclusive statement as to the characteristics contributed by each reactant. Much depends on the particular reactant and the amounts employed. Autoesters having relatively few monomeric units usually result in a more brittle product while those having many of such units usually contribute flexibility with a secondary influence toward rigidity as the number of symmetrical diaryl residues increase. Where the functional groups of the isocyanate are separated by fairly long aliphatic chains so that the acid nuclei are spaced relatively large distances apart within the molecule of the polymer, the product can be expected to be more flexible. On the other hand, where the isocyanate is a tightly knit, cyclic or aromatic structure, the tendency is toward enhanced rigidity or strength.

In the case of the long-chain acid ester of the autoester, there are fewer phenolic hydroxyl groups available for reaction, less cross-linking can occur, and the product is usually more flexible. The extent to which this is apparent is governed by the number of hydroxyl groups that are preempted by esterification. The actual parts by weight of the isocyanate needed for complete reaction is also obviously less in this case. As the number of available hydroxyl radicals increases, more cross-linking is possible and rigidity increases. As the terms are employed herein, "brittle" and "rigid" are not synonymous. The former has more of the connotation of hardness with poor resistance to shattering while the latter implies more in the way of strength and good resistance to bending.

If a monoisocyanate is employed along with the polyisocyanate, the number of reactive foci of the autoester available to the functional groups of the poly-compound is lessened. In arriving at the amounts of reactants to be utilized, the mono-compound must therefore be considered, and in such case the equivalent weight of the isocyanate is the total of the equivalent weights of the mono- and poly-compounds.

In general, the procedure by which protective coating films and molding compositions are prepared in accordance with the present invention involves merely the addition of the condensate to the isocyanate, admixing and converting the mixture by exposure either to normal temperatures or to heat.

For proper mixing, both reactants must ordinarily be in fluid form or one dissolved in the other. While one or both can be melted, if in solid form at room temperature, reaction between them occurs at least at the melting point of the autoester and, for film formation, it is usually preferred to dissolve those which are solid in a solvent. The viscosity of the solution, naturally, is determined by the amount of solvent. Any solvent that is inert to both the autoester and isocyanate may be used, an example being methyl ethyl ketone among many others. Solution of reactants has been found to be fairly stable for moderate periods at normal temperatures, up to a week or more. Such stability is a feature of some importance as it permits large quantities of the mixture to be made up at one time and then used as needed. For heat cure, temperatures of about 80–225° C. for times of about one hour to about five minutes have been found satisfactory. For curing at room temperature, it is preferred that any of the well known conversion catalysts for reactions of this type, such as triethylamine, be added in small amounts in order to reduce the amount of time needed for the film to harden. When early conversion is of no special advantage, the catalyst may be dispensed with. As the examples show, the characteristics of the cured films vary somewhat with the type and amount of the isocyanate employed, with some being better than others, as would ordinarily be expected. As a whole, however, the films possess characteristics that compare favorably with many other available materials, especially as regards alkali resistance, so that the product of the invention is quite useful for a variety of purposes.

Where solid foam or cellular structures are desired, they may be obtained by mixing a molten autoester with a suitable conversion catalyst, of which triethylamine is again an example, in an appropriate reaction vessel, adding the isocyanate while agitating, allowing the mixture to foam unimpeded, and converting by heating, as in a draft oven, at a temperature of about 80–150° C. or more for from about 5–30 minutes, or by normal temperatures for much longer periods. Although not essential, it is usually desirable to employ an emulsifier in order to obtain a more homogeneous mixture of the reactants. The instant process may be carried out readily in any system which provides for stirring and has sufficient space for the foaming action to proceed unhindered. A modification of a unit currently used in commercial urethane foam production may be employed. Such a system comprises two supply tanks connected to a pressure-mixing nozzle by suitable feed lines. One tank contains the isocyanate and the other tank, which usually must be heated, contains the autoester emulsified with the emulsifying agent together with the catalyst. The autoester and isocyanate are fed from the tanks to the nozzle where they are mixed under pressure and flowed into pans where the foaming reaction is allowed to proceed unhindered. Again, the foams may be cured in a suitable draft oven at elevated temperatures, thus accelerating the operation. Although the foams may be cured by exposure to normal temperatures as in the case of the films, this considerably prolongs the curing time and a heat cure is preferred.

The carboxyl group of autoester has a special role in the formation of urethane foams. Such groups in the course of the reaction decompose to form gaseous carbon dioxide which bubbles through the mixture to produce a cellular structure. Thus, a foaming medium is inherently present to a certain extent and may eliminate the need, in some instances, for an external foaming agent. Frequently, however, it proves advantageous to add small amounts of water, say up to about 5% by weight of the mixture, to assist in the foaming action, the water producing additional $CO_2$ as is well known. The density of the foams made as described herein varies not only with the particular isocyanate selected for reaction but with the temperature of the conversion as well. It has been found that as the temperature of this stage is increased, the density of the foam also increases, due presumably to the increased loss of $CO_2$ from the mixture at the higher temperatures.

The toughness and rigidity generally contributed by the autoester are especially significant in the case of foam structures which have, in the past for the most part, been rather soft, and spongy in texture. These characteristics, together with the resistance to water and chemicals that the present foams exhibit as well as a very low density when compounded to this end, constitute a rather exceptional combination in this field, so that the present invention should be particularly valuable in producing foam solids for such uses as insulation, crash linings for vehicles, aircraft, etc., and structural components alone or in conjunction with outer coverings of wood or metal.

For the sake of brevity as well as convenience, most of the remainder of this disclosure will be presented in the form of three tables, the first two giving examples of the reactants, along with some of their pertinent properties, and the third providing working examples of the invention in the coating field.

The 4,4-bis(4-hydroxyphenyl)pentanoic acid mentioned in Table I was prepared in accordance with the following procedure. A mixture of 3 mols of phenol, 1 mol of levulinic acid, and 250 parts of 37% aqueous hydrochloric acid was agitated at 50° C. for 72 hours. The upper organic layer was removed from the aqueous HCl by decantation. The product was then subjected to vacuum distillation, using a water aspirator, at a pressure of 15 to 30 mm. with the application of heat until the temperature had reached 165–170° C., thereby removing volatile materials including any unreacted HCl, water, and major portion of unreacted phenol and some of the unreacted levulinic acid. Vacuum distillation was continued using a vacuum pump system which reduced the pressure down to 1 mm. of mercury, while the reaction temperature was gradually raised to 200° C., heating in the range of 170–200° C. extending over a period of around 45 minutes. The residual product was employed in each of the examples of Table I to prepare the autoester. Of these examples, I, II, IV, and VII illustrate the formation of simple autoesters with varying acid numbers while V and VI demonstrate the preparation of autoesters having acyloxy substituents.

TABLE I.—REPRESENTATIVE AUTOESTERS OF DIPHENOLIC ACIDS

| No. | Name | Abbreviation | Isocyanate equivalent (observed) |
|---|---|---|---|
| 1 | High acid number autoester of DPA [1]: To a 1 liter, 3-necked flask equipped with reflux condenser, thermometer, and agitator there was charged 485 parts of DPA prepared from phenol and levulinic acid. 153 parts of acetic anhydride was added and the mixture was heated to reflux. After refluxing for 1 hour, the apparatus was changed by inserting a Dean and Stark trap between the condenser and flask. With inert gas bubbling slowly through the reaction mixture, acetic acid was distilled from the contents of the flask. The temperature was raised slowly over a period of 3 hours 40 minutes to 212° C. A vacuum of 50–80 mm. was applied and held for 1 hour at a temperature of 205–215° C. At the end of the distillation, a total of 160 parts of acetic acid was collected. A yield of 548 parts of a clear, dark amber, resinous product having an acid number of 67.2 was isolated. | AE 1 | 520.7 |
| 2 | Medium acid number autoester of DPA: Using the procedure of Example 1, 485 parts of DPA and 204 parts of acetic anhydride were refluxed and the acetic acid removed by heating for 4½ hours slowly over the temperature range of 145–200° C. A vacuum was applied as before for 20 minutes at 210–225° C. and 203 parts of acetic acid was isolated. A resinous product of 542 parts having an acid number of 57.0 was obtained. | AE 2 | 1,258 |
| 3 | Very high acid number autoester of DPA: To a 1 liter, 3-necked flask equipped with agitator, reflux condenser, and thermometer there was charged 485 parts of DPA. 214 parts of acetic anhydride was added to the flask and the mixture was refluxed for 1 hour in a stream of inert gas. A Dean and Stark trap was inserted between the condenser and flask and acetic acid was removed by distillation in vacuo at 50–80 mm. pressure over a period of 14¼ hours at a temperature of 150–157° C. A resinous product of 595 parts having an acid number of 95.2 was isolated. | AE 3 | 228.8 |
| 4 | Very low acid number autoester of DPA: Using the procedure of Example 3, 485 parts of DPA and 180 parts of acetic anhydride were refluxed, after which 172 parts of acetic acid were separated during 50 minutes of distillation in vacuo. A resinous product of 488 parts having an acid value of less than 1 was isolated. | AE 4 | 415.3 |
| 5 | Stearic acid ester of DPA autoester: Using the procedure of Example 1, 365 parts of DPA and 240 parts of acetic anhydride were refluxed. After the refluxing period had ended, the temperature was reduced to 125° C. and 243 parts of stearic acid added to the reaction mixture. The mixture was then heated and acetic acid was distilled over a period of 3 hours and 10 minutes during which time the temperature gradually raised to 250° C. After holding at this temperature for 1 hour and 50 minutes, vacuum was applied for 55 minutes. A total of 256 parts of acetic acid was collected. 614 parts of a resinous product having an acid number of 28.8 was isolated. | AE 5 | 522.5 |
| 6 | Soya acid ester of DPA autoester: Using the procedure of Example 1 as modified and set forth in Example 5, 365 parts of DPA and 200 parts of acetic anhydride were refluxed. After the reflux period, 178 parts of soya fatty acids were added to the reaction mixture and distillation of acetic acid commenced. The temperature was gradually raised to 250° C. during 6 hours and held for 4 additional hours. No vacuum was applied and 205 parts of acetic acid was distilled. 565 parts of a resinous product having an acid number of 43.5 was obtained. | AE 6 | 364.0 |
| 7 | High acid number autoester of DPA: Using the procedure of Example 1, 286 parts of DPA and 51 parts of acetic anhydride were refluxed. After refluxing, distillation of acetic acid was commenced and during a period of 4½ hours the temperature was gradually raised to 200° C. The temperature was held at 200–213° C. for 3 hours. At the end of this time, 30 parts of acetic acid had been collected and 277 parts of a resinous product having a softening point of 84° C. and an acid number of 110 was isolated. | AE 7 | 150.6 |

[1] DPA is a trademark for 4,4-bis(4-hydroxyphenyl)-pentanoic acid.

It will be observed that an isocyanate equivalent is specified for each acid. The isocyanate equivalent is defined as the weight of the acid which will react with one equivalent of the isocyanate and will be of assistance in selecting actual amounts of the acid that should be used. The method used in determining the observed values as listed involves reacting a sample of the acid with an excess of toluene-2,4-diisocyanate and then determining the excess isocyanates by reaction with di-n-butylamine. Specifically, the technique used is as follows:

To 25 ml. of methyl isobutylketone is added 3 grams of tolene-2,4-diisocyanate previously standardized against di-n-butylamine and a weight of the acid such that the diisocyanate is present in approximately 100% excess. To this mixture is added triethylamine in an amount equal to 1% of the total weight of isocyanate and the acid. The mixture is refluxed for a period of one hour. After cooling to room temperature, the condenser walls are rinsed with about 25 ml. of redistilled toluene. To this mixture is added 25 ml. of 2 N di-n-butylamine. This mixture is warmed to the boiling point, allowed to stand for one hour at which point 75 ml. of methanol is added, and the excess di-n-butylamine back-titrated with 1 N alcoholic hydrochloric acid. By carrying out the preparation of the acids with great care, values at or approaching the theoretical can be achieved.

The acid number given for each acid has its usual meaning, which is the number of milligrams of potassium hydroxide necessary to neutralize the acid content of one gram of the sample, and provides an indication of the degree of acidity of the product. No significant part of the acid number is thought to be attributable to free acetic acid.

It will be noted that an observed and theoretical amine equivalent is specified for each isocyanate. The amine equivalent refers to the weight of the isocyanate containing one isocyanate group and reacting with one mole of di-n-butylamine. Since the isocyanates available commercially are not necessarily chemically pure, the observed values were obtained for use as a guide in formulating reaction products therefrom as these values provide a measure of the actual purity of each compound.

The analytical procedure used to determine amine equivalents of diisocyanates is found in Monsanto Chemical Company's Technical Bulletin #P-125 and is generally as follows:

Twenty-five milliliters of redistilled toluene and 25 ml. of approximately 2 N di-n-butylamine were placed in a carefully cleaned and dried 250 ml. or 500 ml. Erlenmeyer flask. The sample of diisocyanate was drawn into a warmed glass bulb and the neck sealed off in a flame. Sample weight is determined by the difference in weight between the empty and the filled bulb. The bulb was immersed in the Erlenmeyer flask and crushed beneath the surface of the liquid. The solution was heated to boiling and allowed to cool 1 hour. 100 ml. of technical methanol and 0.5 ml. of bromophenol blue indicator was added. It was then titrated with 1 N HCl to a yellow end point. The indicator was prepared by taking 0.1 g. of bromophenol blue, 1.5 ml. of 0.1 N NaOH diluted with 100 ml. of distilled $H_2O$. The average precision demonstrated by these determinations was ±1.29%.

The following examples, presented in tabular form to conserve space, illustrated the conversion of mixtures of Diphenolic Acid autoesters and polyisocyanates alone and modified with a monoisocyanate to insoluble, infusible products. Each of the autoesters was dissolved in the specified amounts in the designated solvent to a nonvolatile content of 40–60%. The isocyanates were used undiluted. The mixtures obtained by adding all the ingredients together were applied to glass panels at .002″ wet film thickness. The table gives the heat treatment used for conversion. All parts are by weight.

TABLE II.—REPRESENTATIVE ISOCYANATE

| Commercial source, trade name, and abbreviation | Structure | Amine equivalent Observed | Amine equivalent Theory |
|---|---|---|---|
| E. I. du Pont de Nemours & Co., Inc.; Hylene; T Hy T | Toluene-2, 4-diisocyanate 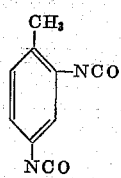 | 90.62 | 87.07 |
| E. I. du Pont de Nemours & Co., Inc.; Hylene; M Hy M | Methylene bis(4-phenyl isocyanate) 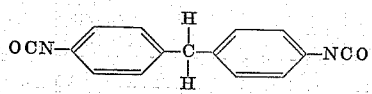 | 139.98 | 125.12 |
| National Aniline Div.; Nacconate 200; N 200 | 3,3'-Bitolylene-4,4'-diisocyanate 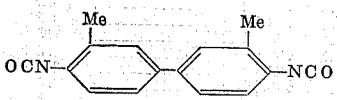 | 132.78 | 132.13 |
| Mobay Chemical Co.; Mondur N5; MO N5 | Naphthylene-1, 5-diisocyanate 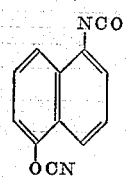 | 116.58 | 105.09 |
| Mobay Chemical Co.; Mondur TM; MO TM | Tritolylmethane triisocyanate 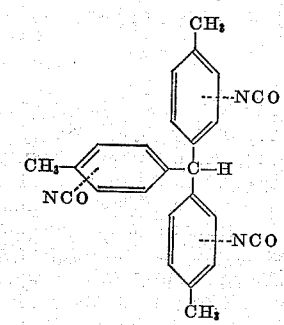 | 107.78 | 123.45 |
| Mobay Chemical Co.; Mondur HX; MO HX | $OCN(CH_2)_6NCO$<br>Hexamethylene diisocyanate | 103.39 | 84.01 |
| Mobay Chemical Co.; Mondur O; MO O | $CH_3(CH_2)_{17}NCO$<br>Octadecylisocyanate | 342.32 | 295.0 |
| Shell Development Co.; Durrenediisocyanate; Dur | 2,3,5,6-tetramethyl-1,4-benezene diisocyanate 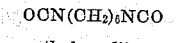 | 111.22 | 108.12 |
| Mobay Chemical Co.; Mondur A; MO A | Alpha-naphthyl isocyanate 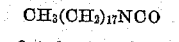 | 172.6 | 169.17 |
| Mobay Chemical Co.; Mondur P; MO P | Phenyl isocyanate 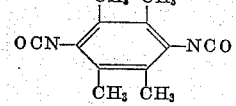 | 125.2 | 119.2 |

It will be understood that certain tabulated examples are superior in some respects to other examples, the purpose of the table being to give an indication of the properties possible with varying compositions. With a particular application in mind, the composition may be formulated accordingly to obtain the desired characteristics. All parts are by weight. Where two solvents are indicated, they were mixed in 50–50 basis.

TABLE III.—EXAMPLES OF THE INVENTION AS A COATING

| Ex. No. | Autoester | Parts | Isocyanate | Parts | Solvent | Conversion | | Withstood in hours | |
|---|---|---|---|---|---|---|---|---|---|
| | | | | | | Time (hrs.) | Temp., °C. | $H_2O$ at 100° C. | 5% aqueous NaOH at 25° C. |
| I | AE 6 | 1.82 | Hy T | .91 | MIK [1] | 0.5 | 175 | 6 | 89½+ |
| II | AE 5 | 2.61 | Hy M | 1.12 | MIK [1] | 0.5 | 175 | 6+ | 89½+ |
| III | AE 2 | 2.52 | N-200 | .27 | MIK [1] | 0.5 | 175 | 6+ | 1¼ |
| IV | AE 1 | 3.65 | Mo-HX | .52 | MIK [1] | 0.5 | 175 | 1 | ½ |
| V | AE 7 | .75 | Mo N5 | .58 | MIK [1] | 0.5 | 175 | 1 | ½ |
| VI | AE 3 | .92 | Mo TM | .65 | MIK [1] | 0.5 | 175 | 14+ | 35 |
| VII | AE 4 | .83 | Hy T | .36 | MIK/DIOX [2] | 0.5 | 175 | 11+ | 89½+ |
| VIII | AE 3 | .23 | Hy M | .28 | MIK | 0.5 | 175 | ½ | 65 |
| IX | AE 7 | .75 | N-200 | .40 | MIK | 0.5 | 175 | 12+ | ⅙ |
| X | AE 2 | 1.26 | Mo-HX | .21 | MIK | 0.5 | 175 | 12+ | 1½ |
| XI | AE 5 | 2.61 | Mo-N5 | .35 | MIK | 0.5 | 175 | 6 | 46 |
| XII | AE 6 | 1.82 | Mo-TM | .65 | MIK | 0.5 | 175 | 14+ | 89½+ |
| XIII | AE 1 | 2.6 | Hy M | .98 | MIK | 0.5 | 175 | 12+ | 46 |
| XIV | AE 4 | .83 | Hy T | .36 | MIK/DIOX | 0.5 | 175 | 6+ | 89½+ |
| XV | AE 6 | 1.82 | Mo P / Hy T | .25 / .45 | MIK | 0.5 | 175 | 16+ | 50+ |
| XVI | AE 1 | 2.60 | Mo A / Hy M | .52 / .84 | MIK | 0.5 | 175 | 16+ | 50+ |

[1] MIK is abbreviation for methyl isobutyl ketone.
[2] DIOX is abbreviation for dioxane.

In order to demonstrate preparation of foam resin structures in accordance with the invention, the following examples were prepared:

*Example XVII*

25 parts of the autoester AE 1 were heated until melted and thereafter mixed with 2.0 parts of polyoxyethylene sorbitan mono-oleate, an emulsifier sold under the tradename Tween 80 by Atlas Powder Company, and 0.1 part of triethylamine to form a homogeneous mixture. Then, 10 parts of toluene-2,4-diisocyanate were stirred into the mixture while the latter was maintained at 110° C. The evolution of foam occurred almost instantaneously and the mixture solidified within a short time, although heating was continued for about 5 minutes to insure that a complete cure had been obtained. The result was a brittle, rigid foam having cells of irregular size dispersed throughout.

*Example XVIII*

Example XVII was repeated except that 7.3 parts of hexamethylene diisocyanate were employed as the isocyanate. The product was a hard, rigid, tough foam having an irregular cell structure.

The aforegoing examples, both as to films and foams, are furnished only for the guidance of those seeking to practice the invention and not for the purpose of defining the boundaries in which it is operative. The numerous other embodiments are possible and will be suggested by these relatively few illustrations.

Although the examples describe the preparation of products in which the reaction is allowed to proceed to the point where the product is infusible and insoluble, it will be appreciated that the reaction could be terminated short of this point to yield intermediate products. For certain applications, it may be desirable to carry the reaction to an intermediate stage and effect the final cure by exposure either to room temperature for a long period of time or to a further heat treatment. It will also be understood that although the examples in the tables were converted to the insoluble, infusible state by means of heat, this was done largely in the interest of saving time and the same result can ordinarily be obtained at room temperature for much longer periods of time.

It is contemplated by the invention that various inactive ingredients, such as fillers, pigments and plasticizers can be added to the reaction mixture to modify the product in known ways. For example, the admixture of a pigment would be suggested where the product was to be used as a decorative coating as a replacement for paint.

Inert fillers, such as siliceous and metallic powders might be added where the specific application demands a product having unusual structural strength or resistance to heat.

It is claimed and desired to secure by Letters Patent:

1. A composition of matter comprising the reaction product of (A) a compound of the general formula $R(NCX)_z$, wherein R is an organic radical having a valency equal to z, X is a chalcogen having an atomic weight of less than 33 and z is an integer having a value of more than 1 and (B) a resinous polymeric self-ester of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms, wherein the reactive function groups of (A) and (B) are present in an equivalent ratio of from 1:5 to 5:1.

2. The composition of matter of claim 1 wherein the pentanoic acid of (B) consists essentially of 4,4 bis(4-hydroxyaryl)pentanoic acid wherein the hydroxyaryl radical is a hydroxyphenyl radical and is free from substituents other than alkyl groups of one carbon atom.

3. The composition of matter of claim 1 wherein the pentanoic acid of (B) consists essentially of 4,4 bis(4-hydroxyphenyl)pentanoic acid.

4. The composition of matter of claim 3 wherein the reactive functional groups of (A) and (B) are present in an equivalent ratio of from about 2:1 to 1:2.

5. The composition of matter of claim 4 wherein R of (A) is an aromatic organic radical.

6. The composition of matter of claim 4 wherein R of (A) is an aliphatic organic radical.

7. A composition of matter comprising the reaction product of (A) a compound of the general formula $R(NCX)_z$, wherein R is an organic radical having a valency equal to z, X is a chalcogen having an atomic weight of less than 33 and z is an integer having a value of more than 1, (B) a resinous polymeric self-ester of a pentanoic acid consisting essentially of 4,4-bis(4-hydroxyaryl)pentanoic acid wherein the hydroxyaryl radical is a hydroxyphenyl radical and is free from substituents other than alkyl groups of from 1–5 carbon atoms, wherein the reactive functional groups of (A) and (B)

are present in an equivalent ratio of from 1:5 to 5:1 and (C) up to about 5% of the total weight of (A) and (B) of water.

8. A composition of matter comprising the reaction product of (A) a compound of the general formula $R(NCX)_z$, wherein R is an organic radical having a valency equal to z, X is a chalcogen having an atomic weight of less than 33 and z is an integer having a value of more than 1 and (B) an ester of a polyhydric phenol and at least one aliphatic monocarboxylic acid containing at least about 10 carbon atoms, said polyhydric phenol being a resinous polymeric self-ester of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms, said ester having a total carboxyl and hydroxyl radical content averaging greater than 1 per molecule; wherein the reactive functional groups of (A) and (B) are present in an equivalent ratio of from about 5:1 to 1:5.

9. The composition of matter of claim 8 wherein the pentanoic acid of (B) consists essentially of 4,4 bis(4-hydroxyaryl)pentanoic acid wherein the hydroxyaryl radical is a hydroxyphenyl radical and is free from substituents other than alkyl groups of one carbon atom.

10. The composition of matter of claim 8 wherein the pentanoic acid of (B) consists essentially of 4,4 bis(4-hydroxyphenyl)pentanoic acid.

11. The composition of matter of claim 10 wherein the reactive functional groups of (A) and (B) are present in an equivalent ratio of from about 2:1 to 1:2.

12. The composition of matter of claim 11 wherein R of (A) is an aromatic organic radical.

13. The composition of matter of claim 11 wherein R of (A) is an aliphatic organic radical.

14. A composition of matter comprising the reaction product of (A) a compound of the general formula $R(NCX)_z$, wherein R is an organic radical having a valency equal to z, X is a chalcogen having an atomic weight of less than 33 and z is an integer having a value of more than 1, (B) an ester of a polyhydric phenol and at least one aliphatic monocarboxylic acid containing at least about 10 carbon atoms, said polyhydric phenol being a resinous polymeric self-ester of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms, said ester having a total carboxyl and hydroxyl radical content averaging greater than 1 per molecule; wherein the reactive functional groups of (A) and (B) are present in an equivalent ratio of from about 5:1 to 1:5, and (C) up to about 5% of the total weight of (A) and (B) of water.

References Cited in the file of this patent

UNITED STATES PATENTS

| | | |
|---|---|---|
| 2,577,281 | Simon | Dec. 4, 1951 |
| 2,645,623 | Hermann | July 14, 1953 |
| 2,798,859 | Bruce | July 9, 1957 |

FOREIGN PATENTS

| | | |
|---|---|---|
| 901,768 | France | Aug. 6, 1945 |

OTHER REFERENCES

Bader: Journal of American Chemical Society, September 5, 1954, vol. 76, pages 4465–4466.